US006993032B1

(12) United States Patent
Dammann et al.

(10) Patent No.: US 6,993,032 B1
(45) Date of Patent: Jan. 31, 2006

(54) BUFFER ARRANGEMENTS TO SUPPORT DIFFERENTIAL LINK DISTANCES AT FULL BANDWIDTH

(75) Inventors: Ronald Dammann, Palo Alto, CA (US); James A. McConnell, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 729 days.

(21) Appl. No.: 09/606,025

(22) Filed: Jun. 29, 2000

(51) Int. Cl.
*H04L 12/28* (2006.01)
*H04L 12/56* (2006.01)

(52) U.S. Cl. .................... 370/395.7; 370/412; 711/170

(58) Field of Classification Search ............. 370/395.7, 370/395.71, 395.72, 400, 401, 412–418, 370/428, 429, 389, 229–231, 235, 388, 368, 370/419, 532, 537; 710/52, 56, 316, 317, 710/36, 38; 711/170, 173, 171, 172
See application file for complete search history.

(56) References Cited

U.S. PATENT DOCUMENTS

| | | | | |
|---|---|---|---|---|
| 4,158,235 A | * | 6/1979 | Call et al. ...................... 710/56 |
| 5,046,039 A | * | 9/1991 | Ugajin et al. .................. 710/56 |
| 5,289,470 A | * | 2/1994 | Chang et al. ............... 711/173 |
| 5,809,557 A | * | 9/1998 | Shemla et al. .............. 711/173 |
| 6,046,817 A | * | 4/2000 | Brown et al. .............. 358/1.16 |
| 6,075,380 A | * | 6/2000 | Lane ............................ 326/40 |
| 6,421,769 B1 | * | 7/2002 | Teitenberg et al. ......... 711/170 |
| 6,526,495 B1 | * | 2/2003 | Sevalia et al. .............. 711/173 |
| 6,577,625 B1 | * | 6/2003 | Chiou et al. ................ 370/381 |
| 6,578,104 B1 | * | 6/2003 | Small et al. ................ 711/104 |
| 6,618,390 B1 | * | 9/2003 | Erimli et al. ............... 370/412 |
| 6,633,946 B1 | * | 10/2003 | Hendel ........................ 710/317 |
| 6,640,300 B1 | * | 10/2003 | Raza ............................. 713/1 |

* cited by examiner

*Primary Examiner*—Brian Nguyen
(74) *Attorney, Agent, or Firm*—Schwegman, Lundberg, Woessner & Kluth, P.A.

(57) ABSTRACT

The present invention is directed to buffer arrangements (e.g., via concatenation) to support differential link distances at full bandwidth.

23 Claims, 3 Drawing Sheets

BUFFER ARRANGEMENTS TO SUPPORT DIFFERENTIAL LINK DISTANCES AT FULL BANDWIDTH

FIELD

The present invention is directed to buffer arrangements (e.g., via concatenation) to support differential link distances at full bandwidth.

BACKGROUND

A data network is generally consisted of a network of nodes connected by physical (e.g., wires) and or non-physical (e.g., optical, radio-frequency) links. Each link may support a number of logical point-to-point channels. Each channel may be a bi-directional communication path for allowing commands and message data to flow between two connect nodes within the data network. Each channel may refer to a single point-to-point connection where message data may be transferred between two endpoints or systems. Data may be transmitted in packets including groups called cells or packets from source to destination often through intermediate nodes.

In many data networks, hardware and software may often be used to support asynchronous data transfers between two memory regions, often on different systems. Each system may correspond to a multi-processor system including one or more processors. Each system may serve as a source (initiator) system which initiates a message data transfer (message send operation) or a target system of a message passing operation (message receive operation). Examples of such a multi-processor system may include host servers providing a variety of applications or services, and I/O units providing storage oriented and network oriented I/O services.

Within the present disclosure, the sending of data in a form of data packets from sender-device-to-receiver-device will be used in providing discussions of an example background and/or example embodiments of the invention, although practice of the present invention is not limited thereto. Further, a fabric-based switching environment may be used in providing discussions of the example background and/or example embodiments of the invention, although practice of the present invention is not limited thereto.

Turning now to FIG. 1 for background discussions, a sender device SENDER sends data packets $P_1$, $P_2$, $P_3$, . . . $P_N$, $P_{N+1}$ along a communication link L to a receiver device RECEIVER. The sender device may be any device, for example, may be chosen from a non-exhaustive listing of: a server, a host computer, a switch. Similarly, the receiver device may be any device, for example, may be chosen from the non-exhaustive listing of: a server, a target computer, a switch. Further, although only one input (PORT-R) and/or output (PORT-S) port is shown (for simplicity of discussion) with respect to the FIG. 1 sender device and receiver device, such devices have multiple input and/or output ports (as will become more apparent in discussion ahead). Many arrangements may be made to ensure that all data packets sent by a sender device are properly received at the receiver device. For example, as shown in FIG. 1, often, each port, e.g., a receiving port PORT-R on the receiver device, will have a BUFFER assigned thereto to store data packets, the BUFFER being of a predetermined size (e.g., capable of storing N data packets). It has been found in the researching of the present invention, that a predetermined buffer size can have a constraining effect on a length of the communication link which can be used with the resultant device. What is needed is a more versatile buffer arrangement which can better support variable communication link lengths and/or bandwidth.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
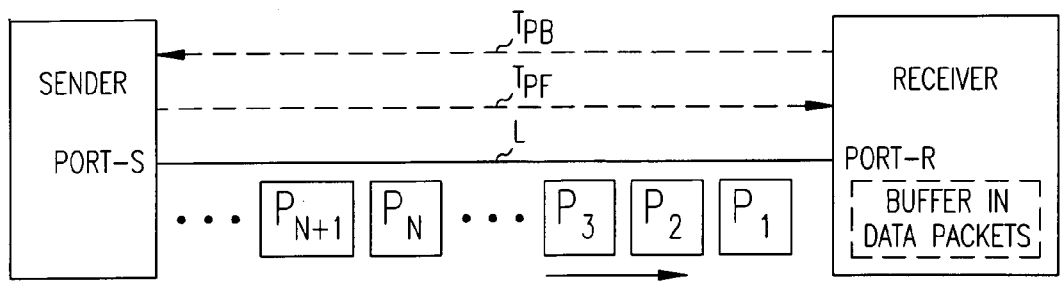
FIG. 1 is an example block diagram of a sender/receiver arrangement useful in understanding the present invention.

Before beginning a detailed description of the subject invention, mention of the following is in order. When appropriate, like reference numerals and characters may be used to designate identical, corresponding or similar components in differing figure drawings. Well known power/ground connections to ICs and other components may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Figure 2:
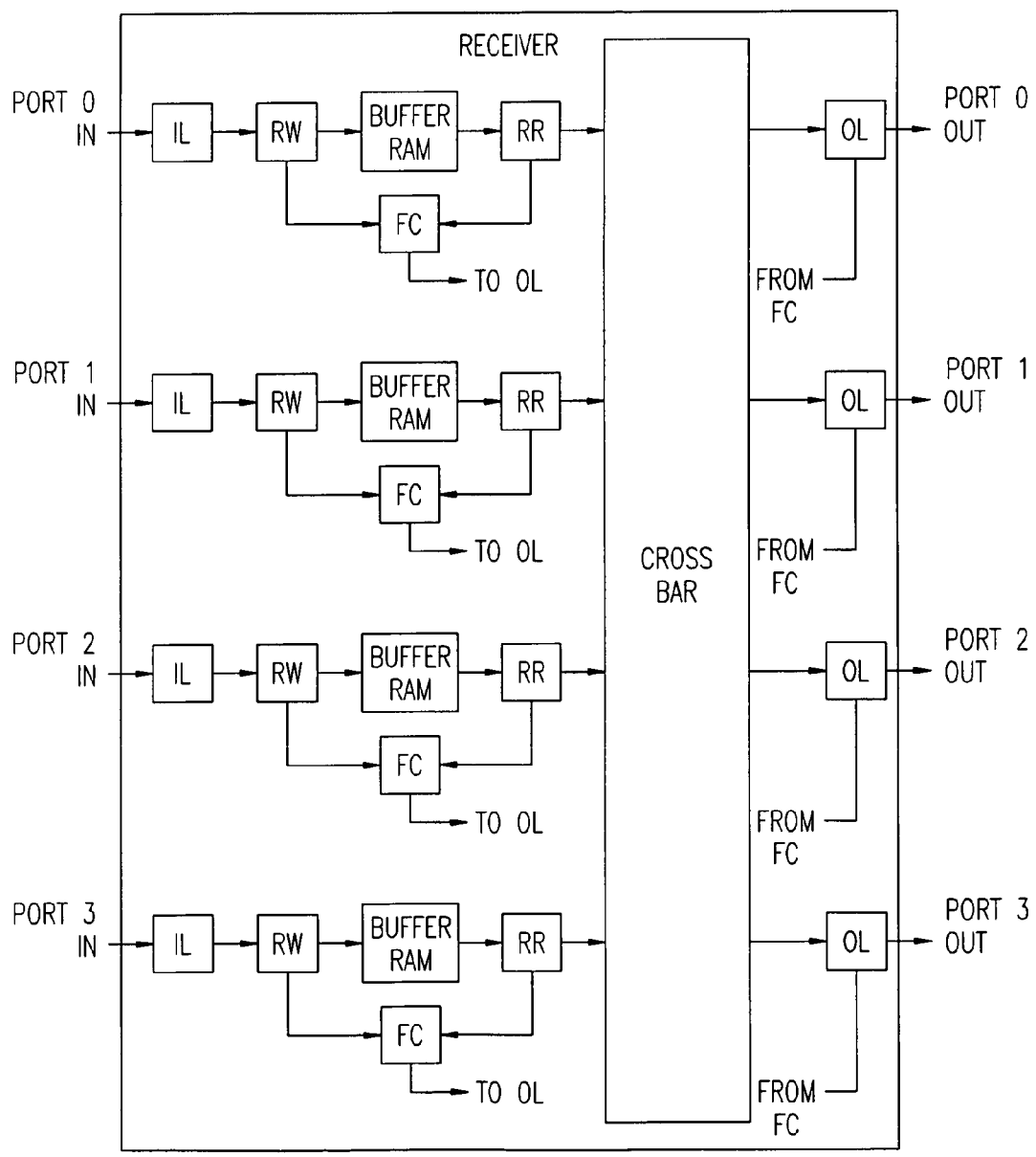
FIG. 2 is an example block diagram of an example receiver having a disadvantageous buffer arrangement.

Discussion now continues/expands from the FIG. 1 background discussions, with an example background receiver device which is useful in gaining a better understanding of the invention. More particularly, FIG. 2 illustrates a switch as an example receiver device and containing a buffer arrangement. Although the FIG. 2 switch is illustrated (for sake of brevity and simplicity) as having four input ports (Port 0 In, Port 1 In, Port 2 In, Port 3 In) and four output ports (Port 0 Out, Port 1 Out, Port 2 Out, Port 3 Out), practice of the invention is not limited to any specific number of input ports or output ports, e.g., FIG. 2 could easily/advantageously be reconfigured as an eight-input-port/eight-output-port switch. Further, it should be understood that the ports are not necessarily external to the device, i.e., the buffer ports may be located somewhere internally within the device.

The FIG. 2 switch has the following logic blocks:

IL (Input Logic): This block receives data from a communication link, detects Cell/Packet boundaries and detects flow control information. This logic runs in an "input clock domain" and converts to an internal "core clock" domain. All of the other logic blocks may use the "core clock".

RW (RAM Write): This logic block writes packets into the Buffer RAM. It also passes flow control information to the FC block.

Buffer RAM: This buffer receives data from each port. This RAM must be large enough to support the propagation delay of the external cables and determines the maximum cable length that can be supported at full link speed.

RR (RAM Read): This logic block reads packets from the RAM, maps the packet destination address to the correct output port, and uses the CrossBar to send the data to the correct output port. It also sends flow control information to the FC block.

FC (Flow Control): This logic block implements the flow control function for each port. It receives flow control information from the RW logic and sends commands to the OL logic block to start or stop sending data. It also monitors data written by the RW block and data read by the RR block to determine how much space is available in the Buffer RAM and sends flow control commands to the OL block. The OL block sends the flow control commands to the output port to pass them to the remote end and implement the flow control protocol.

OL (Output Logic): This logic block sends data to the output port to send data packets or flow control commands.

CrossBar: This logic block connects the RR block of each port to the OL block of each port. Any RR block can send data to any OL block. Not shown in the above block diagram is an Address Mapping Logic that maps the packet destination addresses to output ports or an Arbitration Logic that controls traffic as to when RR logic from each port can send data to the OL blocks.

An important aspect to be noted with respect to the FIG. 2 example switch is that such switch is provided in a completed package, with a predetermined buffer size preassigned to each port. Such package may be in a form of a printed circuit board having components soldered thereon. Further, the package may be in sealed form, e.g., encased in resin.

Keeping such in mind, discussion moves next to a more detailed discussion of disadvantageous effects of a predetermined buffer size assigned to a port within a receiver device. More particularly, care must be taken to ensure that the finite-sized buffer does not overflow with excessive data packets incoming from the sender device. For example, the FIG. 1 example of sending data packets $P_1$, $P_2$, $P_3$, ... $P_N$, $P_{N+}$ ... would overflow the BUFFER having a storage capacity of N data packets (e.g., packets $P_{N+1}$, ... may be excessive), and any excess data packets beyond this capacity would be lost.

Two other items are useful in gaining a thorough understanding of the invention. More particularly, as a first item, due to the real-world constraints of physics, transmission along the link L is not instantaneous, and accordingly, there is an inherent time $T_{PF}$ (propagation forward) delay for data/signals to propagate forward from SENDER-to-RECEIVER, as well as an inherent time $T_{PB}$ (propagation backward) delay for data/signals to propagate backwards from RECEIVER-to-SENDER along the link L. Turning next to the second item, it should be understood (for purposes of this disclosure) that because of the delay, the communication link L may, in essence, act as a buffer in that at any given time data packets sent by the SENDER may be propagating there-along without having been received as of yet by the RECEIVER.

There are numerous flow control protocols directed toward providing coordination between a sender device and receiver device to avoid buffer overflow. One type of coordination arrangement may be termed an "XON/XOFF protocol", where a receiver device sends signals back through the communication link to the sending device to attempt to directly turn the sending device's packet transmissions ON and OFF in real-time to control data flow. A problem with this arrangement is the fact that the RECEIVER's ON/OFF control of the SENDER cannot be instantaneous owing to the above-described real-world inherent time $T_{PB}$ (propagate backwards) delay for data/signals to propagate backwards from SENDER-to-RECEIVER along the link L. Such may result in untimely/inadequate control and thus result in subsequent BUFFER overflow.

More particularly, assume that upon receipt of the first data packet at occurrence of the inherent time $T_{PF}$, that the RECEIVER immediately (ignoring processing time of the receiver) returns an XOFF signal along the link which then takes inherent time $T_{PB}$ for the signal to propagate back to the SENDER. Accordingly, at the round-trip $T_{PF}+T_{PB}$ time, the SENDER will receive the XOFF signal and temporarily cease sending more packets. However, if the communication link is excessively long such that the round-trip $T_{PF}+T_{PB}$ time resultant from the inherent communication link L delay to shut off the SENDER is excessive, the SENDER may be able to send out excessive packets (e.g., $P_{N+1}$ ... ) which would temporarily be "buffered" along the communication link but which would overflow the BUFFER once propagated to the RECEIVER, i.e., data will be lost if the receive BUFFER is not large enough to hold the data injected into and propagating along the link. Accordingly, a length of the communication link L may be constrained, for example, by a storage capacity of the BUFFER.

One solution to achieve a greater length, would be to physically add more memory to the device to increase a storage capacity of the BUFFER, but such is disadvantageous in that increased storage capacity devices (e.g., random access memory, flash memory) are expensive, and further, the time/effort necessary for physically supplementing/customizing the receiver device would be difficult and/or prohibitively expensive, especially if the device is provided as a sealed package as discussed above. Both the expense and time/effort would render the device financially or otherwise uncompetitive in the marketplace.

Another type of sender/receiver coordination arrangement may be termed a "credit based flow control", where a sender unit initially starts with a predetermined number of "credits" corresponding to a number of data units storable within the buffer of the receiver device and subtracts a "credit" for each unit (e.g., packet) of data sent. A receiver device, in turn, sends renewal "credits" back through the communication link to the sending device as the receiver device finishes processing incoming packets to replenish the sender device's "credits". If the sender device's credits subtract to zero before being replenished, the sender device assumes such is an indication that the receiver's buffer will be filled with the packets sent to-date, and the sender device then idles without sending further packets until renewal credits are received back from the receiver device. Such idling is disadvantageous in terms of not maximizing a bandwidth of the sender device's sending capabilities or the communication link's data handling, i.e., bandwidth, capabilities. Again, a length of the communication link L may be constrained to allow a functional system.

Again, one solution to support a greater communication link length would be to physically add more memory to the device to increase a storage capacity of the BUFFER, i.e., thereby increasing a number of the sender device's initial "credits". However, again, such is disadvantageous in that increased storage capacity devices (e.g., random access memory, flash memory) are expensive, and further, time/effort necessary for supplementing/customizing the receiver device would be prohibitively expensive. Again, both would render the device financially uncompetitive in the marketplace.

Figure 3:
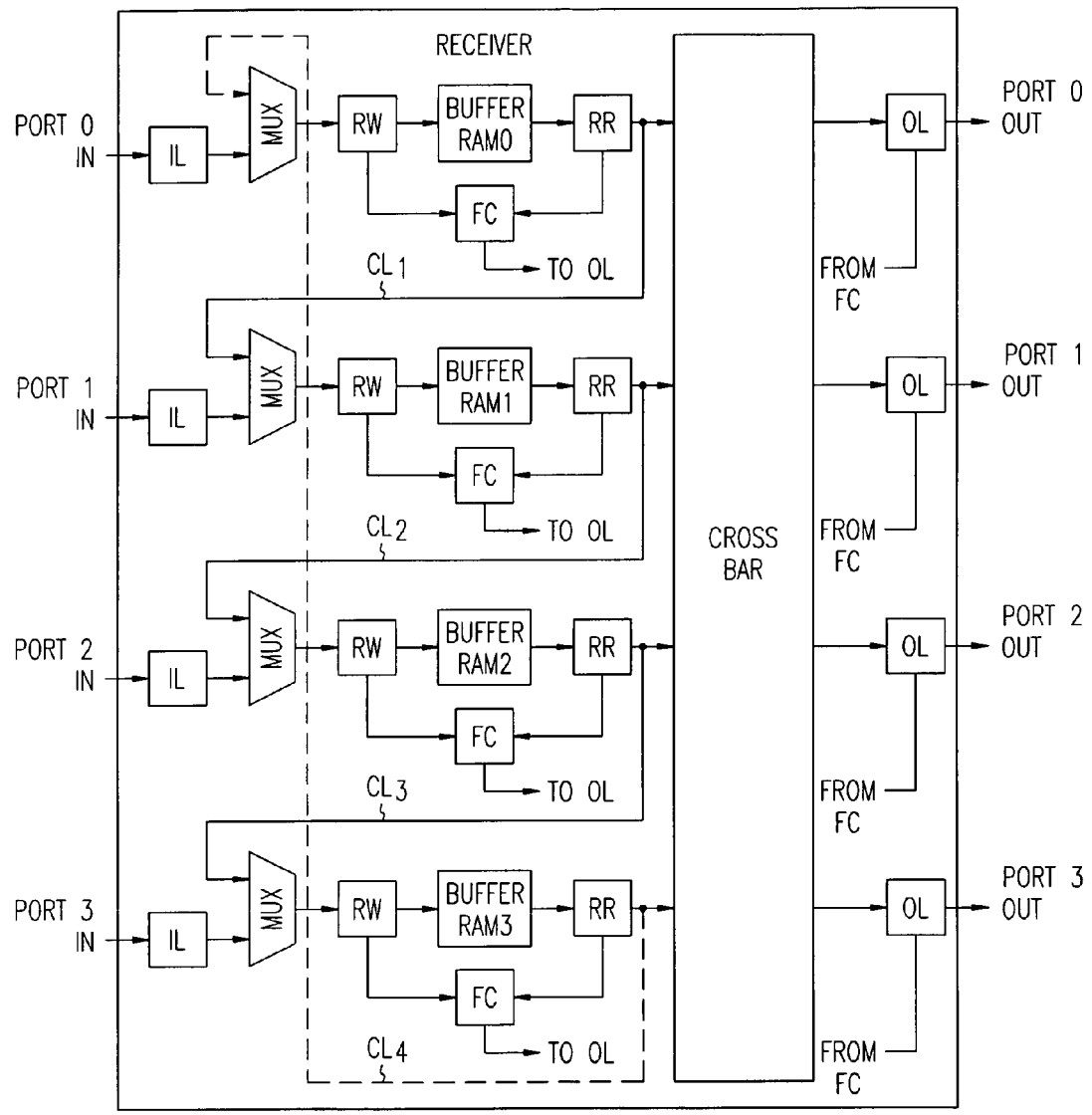
FIG. 3 is an example block diagram of an example receiver having an example advantageous buffer arrangement of the present invention.

FIG. 3 is an example embodiment of an example receiver device including an example buffer arrangement of the present invention. More particularly, FIG. 3's arrangement is similar to the FIG. 2 background arrangement, so redundant discussion of similar/analogous FIG. 3 items will be omitted for sake of brevity, i.e., only the differing arrangements will be discussed.

A multiplexor (Mux) and a concatenation line ($CL_1$, $CL_2$, $CL_3$, $CL_4$) arrangement has been added to each input port, that can be used to selectively connect the RW Block of each port to the Port's IL Block or the RR Block of another port. This allows data read from the Buffer RAM of one port to be fed forward and written to the Buffer RAM of another port and can be used to effectively increase the size of Buffer RAM available for a given port, albeit at the expense of losing use of a port. The Buffer RAM0, Buffer RAM1, Buffer RAM2 and Buffer RAM3 may be provided according to any number of different configurations, e.g., each may be provided as separate discrete memory devices, as a separate area within a common memory device, or any combination thereof. In the present disclosure, a predetermined base size of buffer (e.g., 1 megabyte) will be called a "1X buffer", while buffers having multiples of the base size will also be appropriately named according to a multiple of the base size it contains, e.g., a "2X buffer", "3X buffer", etc.

Turning discussion now to operation of the FIG. 3 arrangement, and more particularly, turning first to discussion of a normal mode of operation, in normal operation each of the input ports (Port 0 In, Port 1 In, Port 2 In, Port 3 In) has a normal 1X buffer associated therewith, i.e., the Muxes are configured so as to block any forward feeding from one Buffer RAM to another (i.e., concatenation), and instead, are configured to connect the IL Block to the RW Block. That is, the concatenation lines ($CL_1$, $CL_2$, $CL_3$, $CL_4$) are effectively disabled and the Muxes are configured to simply allow data arriving at the input ports to flow through from the IL block to the RW block. Thus, in normal operation, a single buffer is associated with each of the ports, and thus the FIG. 3 receiver operates as a 4-Port switch with 1X buffers.

Turning next to discussion of example concatenation modes, by switching the Port 1 Mux and the Port 3 Mux, the FIG. 3 receiver can be configured as a 2-Port switch with 2X buffers. More particularly, in this configuration, the Port 1 Mux and the Port 3 Mux are configured such that the Ports 1 and 3 are disabled from passing Port 1 In and Port 3 In data therethrough. Instead, the Port 1 Mux is configured so as to allow data from the Buffer RAM0 to be fed through the RR logic block and along $CL_1$, and then through the Port 1 Mux to be written through the RW logic block into the Buffer RAM1. Similarly, the Port 3 Mux is configured so as to allow data from the Buffer RAM2 to be fed through the RR Logic block and along $CL_3$, and then through the Port 3 Mux to be written through the RW logic block into the Buffer RAM3. Thus, Port 0 uses 2X of buffer of a normal mode of operation (i.e., Buffer RAM0 and Buffer RAM 1), and Port 2 also uses 2X of buffer of a normal mode of operation (i.e., Buffer RAM2 and Buffer RAM3). In contrast, disabled Port 1 In and Port 3 In have no buffer memory assigned thereto.

Other concatenation modes are also possible. For example, by switching the Port 1, 2, and 3 Muxes to effectively disable Port 1 In, Port 2 In and Port 3 In, the FIG. 3 receiver can be configured as a 1-Port link repeater with 4X buffers. In this configuration Port 0 uses all four Buffer RAMs, with data from the Buffer RAM0 foward feeding along concatenation line $CL_1$ to the Buffer RAM1, data from the Buffer RAM1 foward feeding along concatenation line $CL_2$ to the Buffer RAM2, and data from the Buffer RAM2 foward feeding along concatenation line $CL_3$ to the Buffer RAM3. It should be apparent that other concatenation mode configurations are possible, and it should be apparent that as a number of initial ports of the device increases, so does a number of possible concatenation mode configurations.

Regarding data flow of the data through the buffers and subsequently out of the output ports (Port 0 Out, Port 1 Out, Port 2 Out, Port 3 Out), if an ordering of the data is required to be maintained within the system, then all data may follow the same path through the buffers so as to maintain proper data ordering. For example, in the above concatenation mode example having Port 0 use all four Buffer RAMs, all data may commonly flow sequentially through all of the Buffer RAM0, Buffer RAM1, Buffer RAM2 and Buffer RAM3, before being fed out of the Buffer RAM 3 to the appropriate output port. In contrast, if an ordering of the data is not required to be maintained within the system (e.g., in a system having data packets assigned sequential packet numbers to facilitate proper ordering at an ultimate receiver), then all data may not have to follow the same path through the buffers so as to maintain proper data ordering. For example, in the above concatenation mode example having Port 0 use all four Buffer RAMs, particular data may be pushed into fewer ones of the Buffer RAM0, Buffer RAM1, Buffer RAM2 and Buffer RAM3 (depending on how much buffer RAM is needed at any given time), and then be read out from differing ones of the Buffer RAM0, Buffer RAM1, Buffer RAM2 and Buffer RAM3 to the appropriate output port. Thus, for example, a data packet which arrived at the FIG. 3 receiver at a later time and stored within the Buffer RAM0 may actually be read out before a preceding data packet which arrived at an earlier time and pushed into the Buffer RAM2. The advantage of such an arrangement is time savings, i.e., time is not wasted forward-feeding data packets to subsequent buffer RAMs if it is not necessary.

To fully implement the port concatenation from the FIG. 2 background example to the FIG. 3 implementation example, the following changes may be made:

Adding the Datapath Muxes as shown. It should be understood that the circuit locations of the FIG. 3 Mux locations are an example only, and that practice of the present invention is not limited thereto, i.e., the Muxs may be provided at different circuit locations from those illustrated in FIG. 3. Further, the Muxs may have a greater number of inputs than just the two illustrated, e.g., the Port 2 In Mux may have an additional input connected to the Port 0 In's RR block to allow data to bypass flowing through the Port 1 In branch.

Modifying some RR and RW and any other appropriate control signals so they work correctly in both normal and concatenation mode configurations. The exact nature of the modifications is dependent upon the exact environment/configuration in which the device is implemented.

Modifying the FC blocks to support the different buffer size configurations and to provide local flow control when a RR block sends data to a RW block. Again, the exact nature of the modifications is dependent upon the exact environment/configuration in which the device is implemented.

Modifying "Device Description" registers so system software can determine the port configuration of the switch.

Modifying the IL and/or OL blocks to allow them to be disabled.

Provide a way to selectively control the port/concatenation configuration of the device. Control of port/concatenation configuration may be accomplished in any number of ways, for example, a non-exhaustive listing of ways includes:

Manual switches (e.g., on-package or on-circuit-board) to select the configuration.

External pin(s) to select the configuration.

An external serial PROM (programmable read-only memory; not shown) could write a configuration register (e.g., on-package or on-circuit-board).

An external microprocessor (not shown) could write a configuration register (e.g., on-package or on-circuit-board).

An NGIO/InfiniBand or any other command/control packet native within the implemented network could write a configuration register (e.g., on-package or on-circuit-board).

Accordingly, it should be apparent that configuration can be made via hardware setting, or via software programming of an appropriate register. Software programming is advantageous in that configurations are easily and remotely configurable, and even may be configurable on-the-fly during system operation without a shutting down of the system.

Figure 4:
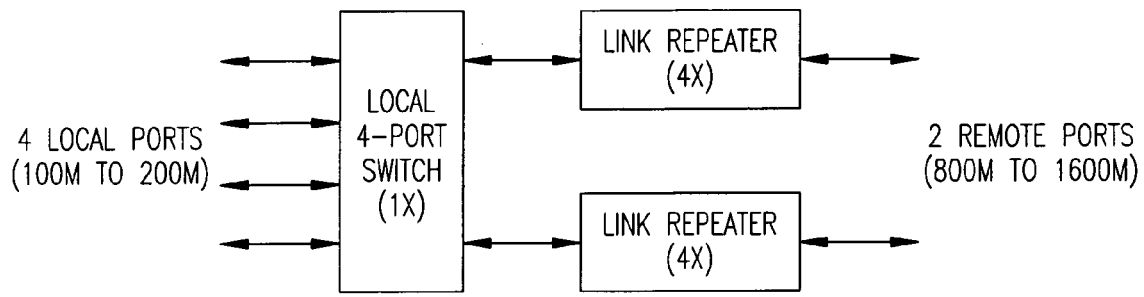
FIG. 4 is an example block diagram of an example configuration of a switch and repeaters embodying the example advantageous buffer arrangement of the present invention.

Discussion turns next to advantages. More particularly, the buffer arrangement of the present invention may allow a single device design to be mass produced to support different link distances. Such versatile single device design could then be configured/used as devices having differing modes/configurations within a single system as shown, for example, in FIG. 4. In most applications (e.g., normal operations), the device would be configured as local devices (e.g., a local 4-port switch with each port being assigned 1X of buffer) to support short links (devices in the same room or adjacent rooms) and a maximum number of ports (e.g., 4 in this example). In contrast, other devices (e.g., in concatenation modes) would be configured as remote devices (e.g., 1-port link repeaters with the single ports being assigned 4X of buffer), such that longer communication links (e.g., devices in adjacent buildings) can be supported.

That is, by having a single, selectively reconfigurable buffer design, the economies of mass production and the ability to maintain only a single type of device in inventory makes the present invention very attractive and competitive in the marketplace. Further, since the additional multiplexors, concatenation lines CL and supportive programming are substantially non-complex modifications requiring little further real-estate, implementation of concatenation arrangements of the present invention into existing devices is relatively easy.

As mentioned previously, practice of the present invention is not limited to any specific technological area, and may be used in all types of environments/devices having buffers associated with ports. For example, the present invention is applicable for use with all types of computer networks, I/O hardware adapters and chipsets, including follow-on chip designs which link together end stations such as computers, servers, peripherals, storage devices, and communication devices for data communications.

For the sake of simplicity, an example implementation (FIG. 5) will concentrate mainly on a simple data network having several example nodes (e.g., computers, servers and I/O units) interconnected by corresponding links and switches, although a wide variety of implementations and arrangements of a number of end stations (e.g., host systems and I/O units), switches and links in all types of data networks may be possible. The end stations (e.g., host systems and I/O units) of the example data network shown in FIG. 5 may be compatible with the "*Next Generation Input/Output (NGIO) Specification*" as set forth by the NGIO Forum on Jul. 20, 1999. Despite being implemented within an example NGIO environment, practice of the invention may also be made, for example, with other recently-developing technologies, i.e., with Future Input/Output (FIO) and/or Infiniband technologies. FIO specifications have not yet been released, owing to subsequent abandonment of FIO in view of an agreement of NGIO and FIO factions to combine efforts on InfiniBand. InfiniBand information/specifications are presently under development and will be published by the InfiniBand Trade Association (formed Aug. 27, 1999) having the Internet address of "http://www.InfiniBandta.org".

Figure 5:
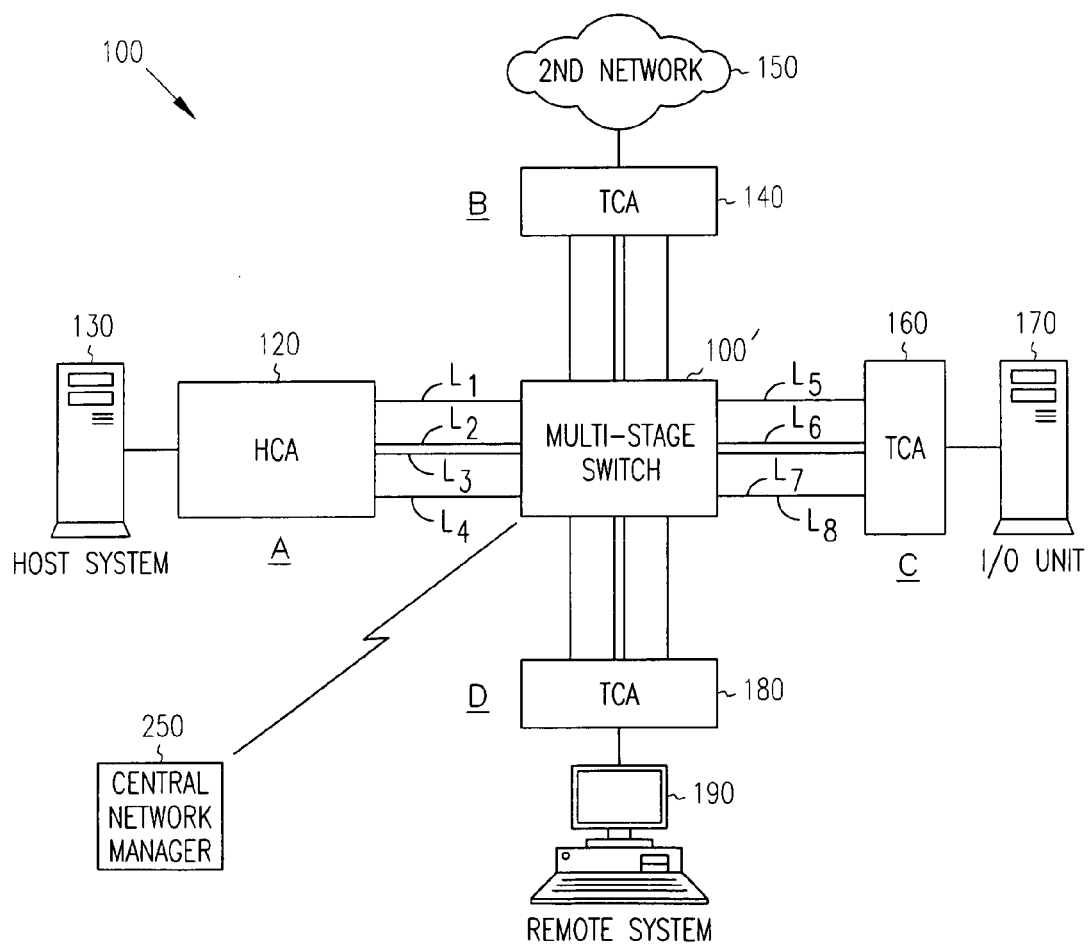
FIG. 5 illustrates an example data network having several nodes interconnected by corresponding links of a multi-stage switched fabric and embodying the example advantageous buffer arrangement of the present invention.

According to the NGIO Specification, the FIG. 5 switch environment 100 may be an NGIO switched fabric (e.g., collection of links, switches and/or switch elements connecting a number of host systems and I/O units), and the endpoint may be a host system including one or more host channel adapters (HCAs) 120, or target systems such as an I/O unit including one or more target channel adapters (TCAs) 140, 160, 180. Both the HCA and TCA may be broadly considered as fabric adapters provided to interface endpoints to the NGIO switched fabric, and may be implemented in compliance with "*Next Generation I/O Link Architecture Specification: HCA Specification, Revision* 1.0" as set forth by NGIO Forum on May 13, 1999 for enabling the endpoints (nodes) to communicate to each other over an NGIO channel(s).

As shown in FIG. 5, the NGIO fabric 100' (multi-stage switched fabric comprised of a plurality of switches) allows a host system and a remote system to communicate to a large number of other host systems and remote systems over one or more designated channels. For example: node A may represent a host system 130 such as a host computer or a host server on which a variety of applications or services are provided; node B may represent another network 150; node C may represent an I/O unit 170, including one or more I/O controllers and I/O units connected thereto; and, node D may represent a remote system 190 such as a target computer or a target server on which a variety of applications or services are provided.

The multi-state switched fabric 100' may include a central network manager 250 for learning network topology, determining the switch table or forwarding database, detecting and managing faults or link failures in the network and performing other network management functions, e.g., for managing/programming the concatenation mode registers in embodiments of the present invention. However, the central network manager 250 may alternatively be incorporated as part of either the host system 130, the second network 150, the I/O unit 170, or the remote system 190.

In the FIG. 5 example implementation, four example communication links $L_1$, $L_2$, $L_3$, $L_4$ are illustrated between the node A's HCA 120 and the multi-stage switch fabric 100', and four example links $L_5$, $L_6$, $L_7$, $L_8$ are illustrated between the multi-stage switch fabric 100' and the node C's TCA 160. As mentioned previously, the NGIO switched fabric 100' may be any collection of links, switches and/or switch elements. It should be apparent at this point that the example FIG. 4 local multi-port switch and single-port link repeaters (embodying implementations of the present invention) can be used as switches and/or repeaters throughout the FIG. 5 multi-stage switched fabric 100'. Further, it should also be apparent that implementations of the present invention could likewise be embodied within any of the HCA and/or TCA. If implemented in the FIG. 5 NGIO environment, the example FIG. 4 local devices (e.g., in an NGIO, FIO or InfiniBand environment) might be able to provide support for communication link distances of 100 M (meters) to 200 M as shown representatively in FIG. 4. Similarly, the FIG. 4 remote devices might be able to provide support for communication link distances of 800 M to 1600 M as shown representatively in FIG. 4. The longer communication links may further require fiber optics and the need Link Repeaters at the other end of the links.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

For example, practice of the invention may be suitable within non-packet-based and non-fabric-based-switching environments, e.g., practice of the invention may be suitable within serial-based, parallel-based, point-to-point, etc., environments. As but one non-exhaustive example, practice may be used for 10 Mb/100 Mb or 1 Gb Ethernet or other types of serial links with flow control protocols. Further, although description of example embodiments of the invention was made concerning an example input port buffer, practice of the invention likewise may be made concerning output buffers (e.g., of sending devices). That is, practice of the present invention may be made wherever it is useful to have the versatility of reconfigurable buffers within a device. Finally, practice of the present invention is not limited to reconfiguring and assigning buffer memory resources equally, or even in multiples (i.e., 1X, 2X, 3X, . . . ) of a base-sized-buffer, among activated ports, e.g., practice may be made by reconfiguring and assigning unequal and/or non-multiple buffer sizes to activated ports.

What is claimed is:

1. A multi-port buffer, comprising:
    a plurality of buffer units, each including
        its own memory having a write block and a read block,
        its own dedicated port input logic,
        its own dedicated port output logic;
    at least one multiplexor, including
        an output coupled to the write block of one of the buffer units,
        a first input coupled to the port input logic of the one buffer unit,
        a second input coupled to the read block of another of the buffer units;
    flow-control logic to switch the multiplexor between its first and second inputs.

2. The buffer of claim 1 further including at least another multiplexor, including
    an output coupled to the write block of the other buffer unit,
    a first input coupled to the port input logic of the other buffer unit,
    a second input coupled to the read block of a further of the buffer units.

3. The buffer of claim 1 further including a plurality of multiplexors, each including
    an output coupled to the write block of a different one of the buffer units,
    a first input coupled to the port input logic of the different one buffer unit,
    a second input coupled to the read block of a further of the buffer units.

4. The buffer of claim 3 where at least some of the multiplexors have further inputs coupled to the memory of additional ones of the buffer us units.

5. The buffer of claim 1 where the buffer memories are physically discrete.

6. The buffer of claim 1 further including a cross-bar switch coupled between the memory and the port output logic of at least some of the buffer units.

7. The buffer of claim 6 where the cross-bar switch can be programmed to send data from the memory of any of the some buffer units to the port output logic of any of the some buffer units.

8. The buffer of claim 1 where at least one of the buffer units includes write logic coupled between the multiplexor and the memory.

9. The buffer of claim 8 where the write logic indicates how much space remains in the memory of its associated buffer unit.

10. The buffer of claim 1 where the flow-control logic is adapted to send commands to the port output logics.

11. A system, comprising:
    a host system;
    a plurality of channels to communicate data to a network;
    a channel adapter including a multi-port buffer, the buffer comprising
        a plurality of buffer units, each including
            its own memory having a write block and a read block,
            its own dedicated port input logic,
            its own dedicated port output logic,
        at least one multiplexor, including an output coupled to the memory of one of the buffer units, a first input coupled to the port input logic of the one buffer unit, a second input coupled to the memory of another of the buffer units, flow-control logic to switch the multiplexor between its first and second inputs.

12. The system of claim 11 further comprising a multi-stage switch coupled to the channel adapter.

13. The system of claim 12 further comprising a central network manager to control the network.

14. The system of claim 12 further comprising a plurality of terminal control adapters coupled to the multi-stage switch.

15. The system of claim 14 where one of the terminal control adapters couples to a further network.

16. The system of claim 11 where the network follows the NGIO protocol.

17. A method, comprising:

transmitting data from a first port input to a first buffer memory associated with the first port input and thence to a first port output;

disabling transmitting data from a second port input to a second buffer memory associated with the second port input;

thereafter, switching data from an output of the first buffer memory to an input of the second buffer memory, and coupling an output of the second buffer memory to the first port output.

18. The method of claim 17 further comprising:

disabling transmitting data from at least a third port input to at least a third buffer memory associated with the third port input;

switching data from the output of the second buffer memory to an input of the at least third buffer memory, and coupling an output of the at least third buffer memory to the first port output.

19. The method of claim 18 where data flows from the first port input through a first multiplexor, the first buffer memory, a second multiplexor, the second buffer memory, thence to the first port output.

20. The method of claim 18 where not all data follows same path through the buffer memories.

21. The method of claim 17 where transmitting data from the second port is disabled in response to a command from a flow-control logic.

22. The method of claim 21 further comprising informing the flow-control logic how much space is available in the first buffer memory.

23. The method of claim 17 where the data is packet data.

* * * * *

UNITED STATES PATENT AND TRADEMARK OFFICE
CERTIFICATE OF CORRECTION

PATENT NO. : 6,993,032 B1
DATED : January 31, 2006
INVENTOR(S) : Dammann et al.

It is certified that error appears in the above-identified patent and that said Letters Patent is hereby corrected as shown below:

Column 10,
Line 38, after "buffer" delete "us".
Line 66, delete "logic," and insert -- logic; --.

Column 11,
Line 6, delete "units," and insert -- units; --.

Signed and Sealed this

Twenty-fifth Day of April, 2006

JON W. DUDAS
*Director of the United States Patent and Trademark Office*